United States Patent [19]

Schmeichel et al.

[11] Patent Number: 4,544,196
[45] Date of Patent: Oct. 1, 1985

[54] TRUCK BOX EXTENSION APPARATUS

[76] Inventors: Steven C. Schmeichel; Charles M. Schmeichel, both of Highway 20, Jamestown, N. Dak. 58401

[21] Appl. No.: 682,479

[22] Filed: Dec. 17, 1984

Related U.S. Application Data

[63] Continuation of Ser. No. 399,454, Jul. 19, 1982, abandoned.

[51] Int. Cl.⁴ .................. B62D 33/08; B60P 7/04
[52] U.S. Cl. ................................ 296/26; 296/98; 254/129; 254/243
[58] Field of Search .............. 296/26, 98, 27, 34, 296/36, 99 R, 165, 159, 161, 172, 173, 176; 135/112, 107; 248/351, 352, 354.1; 254/209, 243, 129

[56] References Cited

U.S. PATENT DOCUMENTS

| | | | |
|---|---|---|---|
| 856,159 | 6/1907 | Keller | 248/351 |
| 1,844,809 | 2/1932 | Spaugh | 254/129 |
| 2,766,008 | 10/1956 | Hurd | 254/129 |
| 2,797,124 | 6/1957 | Hauptli | 296/26 |
| 3,184,261 | 5/1965 | Young | 296/26 |
| 3,622,193 | 11/1971 | Schmidt | 296/27 |
| 3,924,889 | 12/1975 | Gogush | 296/26 |
| 3,957,068 | 5/1976 | Cox | 296/27 |
| 4,054,011 | 10/1977 | Ensink et al. | 296/26 |
| 4,095,838 | 6/1978 | Beeler | 296/26 |
| 4,269,443 | 5/1981 | Farmer | 296/36 |
| 4,302,043 | 11/1981 | Dimmer et al. | 296/98 |

Primary Examiner—Robert B. Reeves
Assistant Examiner—Dennis H. Pedder
Attorney, Agent, or Firm—Merchant, Gould, Smith, Edell, Welter & Schmidt

[57] ABSTRACT

An extension apparatus (10) for vehicles is disclosed. The extension apparatus (10) includes a frame assembly having upper and lower frame members (12a,b) which are interconnected by a flexible member (16) attached at the lower and upper edges thereof to the lower and upper frame members (12a,b). The frame assembly is adjustable between raised and lowered positions. The extension apparatus further includes jack means (18) pivotable about a horizontal axis parallel to flexible member (16) and releasably attached to the lower and upper frame members (12a,b), on a cargo bed side of the flexible member, for raising said upper frame member (12b) into the raised position. The frame assembly is suitably attached to the top of the sidewalls (20) of the cargo bed area.

12 Claims, 7 Drawing Figures

U.S. Patent Oct. 1, 1985 Sheet 1 of 2 4,544,196
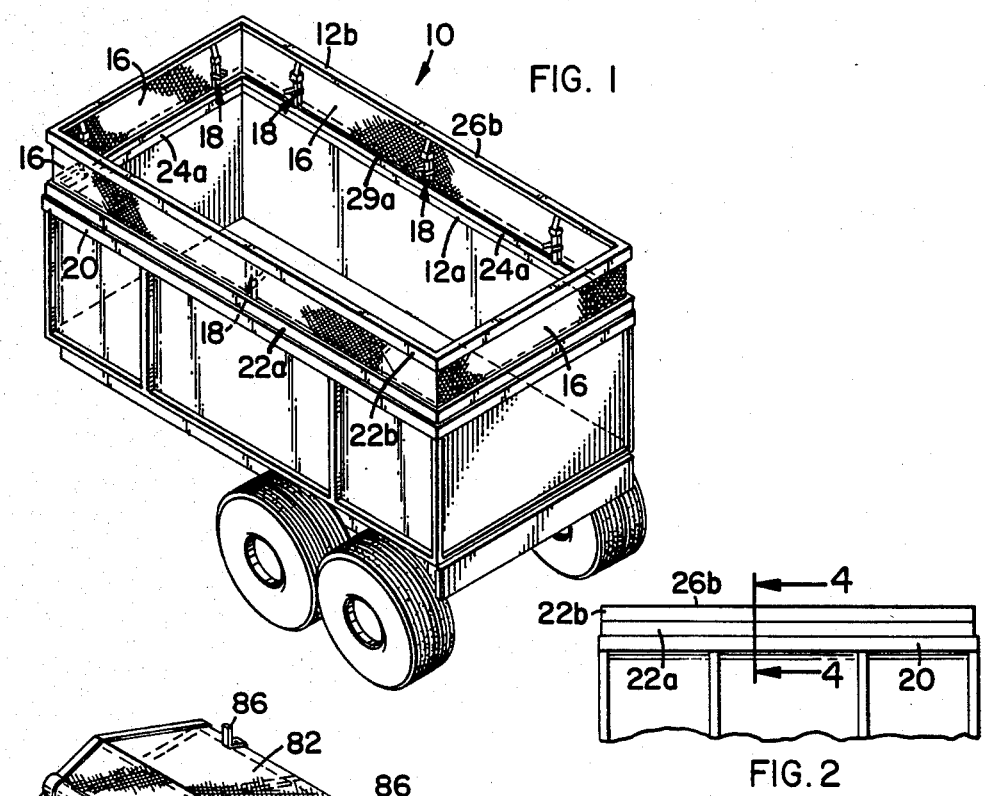
FIG. 1
FIG. 2
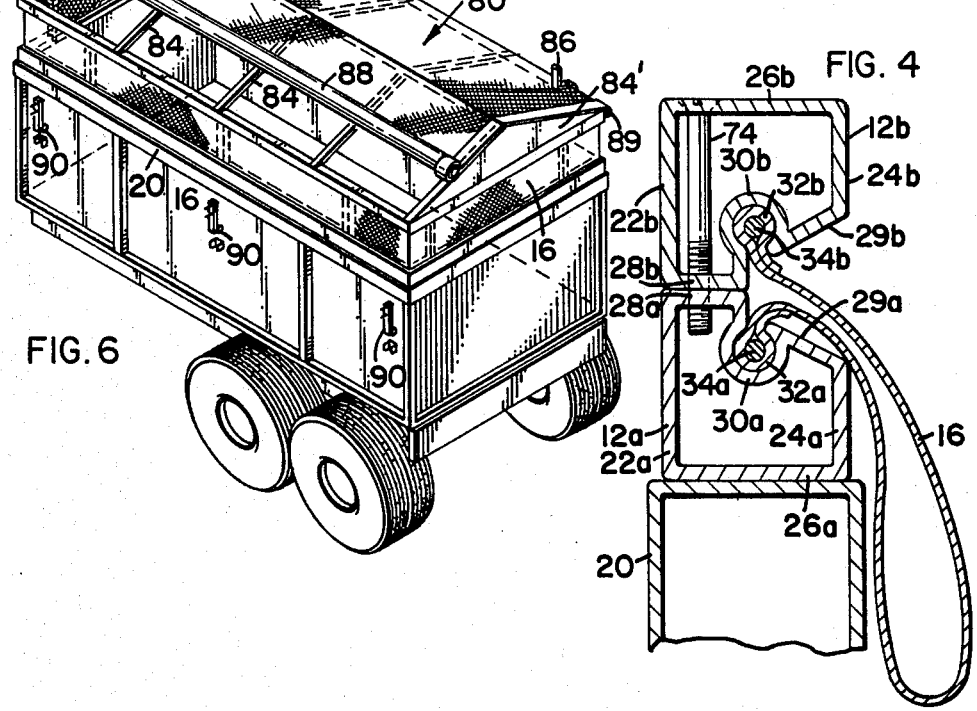
FIG. 6
FIG. 4

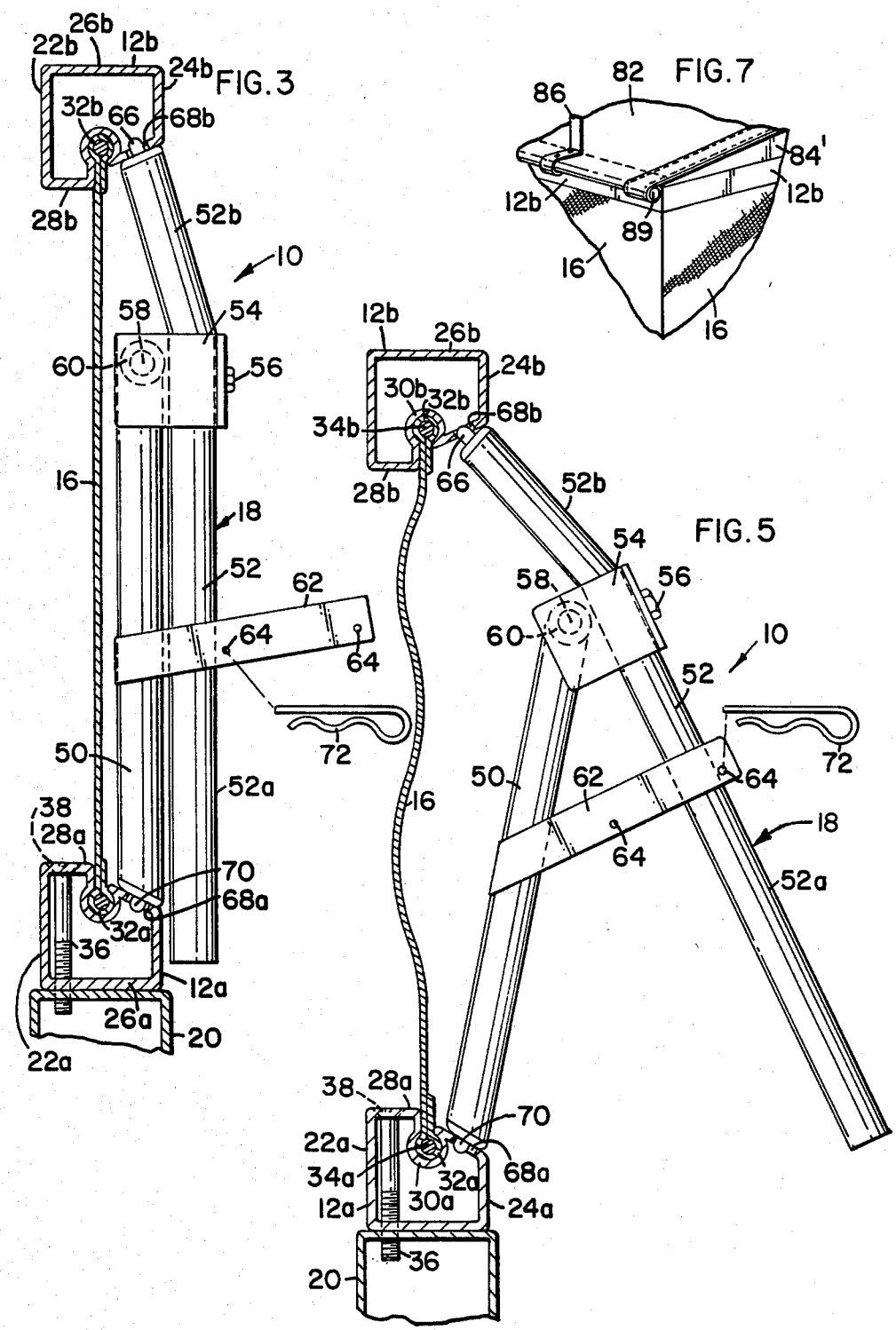

TRUCK BOX EXTENSION APPARATUS

This is a continuation of application Ser. No. 399,454, filed July 19, 1982, abandoned.

TECHNICAL FIELD OF THE INVENTION

Present invention relates to an extension apparatus for a truck box or the like. More particularly, the present invention relates to an adjustable extension which attaches to the top of the sidewalls of an open cargo bed area or the like, the adjustable extension being raised or lowered for volume control and/or height restrictions as required without the necessity of removal from the truck body.

BACKGROUND OF THE INVENTION

Extension apparatus for trucks or the like which increase the volume and height of the cargo or bed portion of such a vehicle are known in the art. However, most extension apparatus require removal from the body of the vehicle when not in use and reattachment thereto when in use. This requires much time and effort and often necessitates the presence of special tools. In addition, the extension apparatus often will not be readily available when needed.

To overcome these and many other problems associated with removable extension apparatus, extension apparatus have been designed which remain permanently attached to the body of the truck thereby doing away with the necessity to remove the apparatus when not in use.

An example of such an extension apparatus can be found in U.S. Pat. No. 4,095,838 issued to Arnold Beeler on June 20, 1978. However, the Beeler patent has several problems associated therewith. For example, flexible fabric is attached between two channel members which in turn are supported in an extended upright, spaced apart relationship by a plurality of horizontally spaced jack-knife support members. The jack-knife support members have a tendency to bind and twist unless the entire extension apparatus is raised substantially simultaneously. Additionally, the jack-knife members are positioned on the outside of the flexible fabric material such that the cargo of the truck box will push the fabric into the jack-knife members thereby causing wear of the fabric.

Furthermore, the positioning of the jack-knife members on the outside of the flexible fabric will often create problems in reaching the extension apparatus during the raising and lowering process. Indeed, it does not appear as though the jack-knife members can be positioned on the inside of the flexible fabric as they will interfere with the fabric material during the folding process when the extension apparatus is lowered.

Additionally, the rectangular open channel-like construction of the paper and lower frame members to which the jack-knife members are attached makes the frame-like members very susceptible to collecting debris such as grain, ice, etc. which might obstruct raising and lowering of the fabric extension.

Furthermore, and very importantly, the Beeler extension apparatus does not appear to have the required strength and sturdiness characteristics needed to support such items as roll-up tarp apparatus which are used to enclose the cargo area.

The present invention solves these and many other problems associated with the prior art.

SUMMARY OF THE INVENTION

The present invention relates to an extension apparatus for vehicles. The extension apparatus includes a frame assembly having upper and lower frame members. The frame assembly is adjustable between raised and lowered positions. A flexible member is attached at the upper and lower edges thereof to the upper and lower frame members. The extension apparatus further includes means releasably attached to the upper and lower members for raising the upper frame member into the raised position.

A particularly advantageous feature of the present invention is that the present invention need not be removed from the top of the cargo area sidewalls when not in use. This provides for an extension apparatus which is readily raised or extended so as to increase the volume and height of the cargo area as needed. Additionally, few special tools are required to raise or lower the extension apparatus. Furthermore, the structural features and design of the present invention make it easily extended into its operational raised position or folded down into its lowered storage position on the top of the cargo area sidewalls.

In one embodiment of the present invention, jack apparatus spaced apart from one another are utilized to raise the upper frame member above the lower frame member into the raised position. The jack apparatus are adjustable to enable raising the upper frame member varying distances from the lower frame member. This increases the ease with which the frame assembly can be raised into its upright position as one end of the frame assembly can be partially extended and then the other end extended such that the entire frame assembly need not be raised simultaneously. The jack apparatus thus assures uniform vertical tension throughout the flexible member.

Yet another advantageous feature of another embodiment of the present invention, is the positioning of the jack apparatus on the inside of the flexible member such that the cargo in the cargo area pushes out on the flexible member. Consequently, the flexible member does not rub against the jack apparatus thereby reducing wear.

Furthermore, the present invention is constructed and arranged such that debris does not interfere with the raising and lowering of the present invention.

A most significant feature of the present invention is the ability of the flexible member in one embodiment to slide longitudinally of the frame members thereby enabling both uniform vertical tension and uniform horizontal tension which results in increased sturdiness. In addition to the uniform tension, the jack apparatus are positioned relatively close to the flexible member when in the extended position thus increasing further the over-all sturdiness of the extension apparatus of the present invention such that it will resist buffeting by the wind and can be utilized with roll-up tarp apparatus.

Furthermore, the present invention can be made of a light-weight material thereby increasing the vehicle's efficiency over conventional extension apparatus.

These and various other apparatus and features of novelty which characterize the present invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views;

FIG. 1 is a view in perspective of the present invention in a raised position;

FIG. 2 is a fragmentary side elevational view of the present invention in a lowered position;

FIG. 3 is an elevational view of a jack apparatus of the present invention;

FIG. 4 is a cross-sectional view along line 4—4 of FIG. 2 of the present invention;

FIG. 5 is an elevational view of a jack apparatus of the present invention partially extended;

FIG. 6 is a perspective view of the present invention utilized with a roll-up tarp apparatus; and FIG. 7 is an enlarged fragmentary view of the embodiment shown in FIG. 6.

DETAILED DESCRIPTION OF THE PRESENT INVENTION

Referring now to the drawings there is shown in FIG. 1 a preferred embodiment of an extension apparatus embodying the principles of the present invention, generally referred to by reference numeral 10, which is mounted on top of sidewalls 20 of a truck box or cargo bed area. It will be appreciated, that while the following detailed description discusses the application of the present invention to the cargo box of a truck, the present invention will have utility in varying applications.

The present invention is adjustable between raised (see FIG. 1) and lowered (see FIG. 2) positions. As illustrated in FIG. 1, the present invention includes lower and upper frame members 12a, 12b interconnected by a flexible planar member 16 which, in some applications, might be a flexible fabric-like material. Horizontally spaced apart jack apparatus 18 releasably interconnected to the lower and upper frame members 12a, 12b are utilized to raise the extension apparatus into an extended or raised position. Once in the raised position, the jack apparatus 18 assists in retaining the extension apparatus 10 in the raised position. In FIG. 2, the present invention is shown in the lowered position with the jack apparatus 18 removed therefrom.

More particularly, as illustrated in FIG. 4, the lower and upper frame members 12a, 12b include hollow generally five-sided polygonal-shaped structures having roughly parallel vertical sides 22a,b and 24a,b, respectively and horizontal bottom and top surfaces 26a,b, respectively. The opposing or facing surfaces of each of the members 12a, 12b have first and second portions 28a,b and 29a,b, respectively. Surfaces 28a,b are generally horizontal such that when the present invention is in the lowered position as illustrated in FIG. 4, surface 28b rests on surface 28a. The surfaces 29a,b interconnect surfaces 28a,b and 24a,b and are oblique with respect to the surfaces 28a,b and 24a,b, thereby defining a wedge or gap between frame members 12a,b adjacent the surfaces 29a,b when the present invention is in the lowered position.

The oblique surfaces 29a,b define arcuately-shaped channels 30a, b extending longitudinally of frame members 12a,b. The channels 30a,b define a cavity having a somewhat restricted opening to the surfaces 29a,b. The restricted openings are generally vertically directed and aligned vertically opposite each other. The frame members 12a,b are beveled and interconnected at the corners of the extension apparatus 10 so as to define continuous channels extending longitudinally about the frame members 12a,b.

As illustrated in FIGS. 3 and 4, the flexible member 16 has a hem-like portion 32a,b extending along the lower and upper edges thereof. Each of the hems 32a,b, has a flexible, arcuately-shaped member such as a rope 34a,b, respectively which is sewn or suitably attached therein such that the hem 32a,b, is adapted for slidable mounting in the channel portions 30a,b, which are constructed and arranged such that the restriction portion thereof retains the hem portions 32a,b in the channel portions 30a,b. The hem portions 32a,b might be formed by sewing the edges of the flexible member 16 or by any other suitable method. The flexible member 16, due to its slidable mounting in the channel portions 30a,b, is horizontally stretched or tightened so as to have uniform horizontal tension throughout. Furthermore, when the frame assembly is extended into the raised position, the flexible member 16 is positioned in a generally vertical plane and has generally uniform vertical tension throughout.

As illustrated in FIG. 3, the lower frame member 12a is suitably fastened to the top of the sidewalls 20 so as to retain the extension apparatus 10 on the sidewalls 20. In the embodiment shown, a bolt-like member 36, having a head portion 38, is inserted through vertically aligned apertures in the surfaces 28a and 26a of the frame member 12a and threaded into the top of the sidewall 20 or suitably attached thereto. The aperture in the surface 26a is constructed and arranged such that the head portion 38 of the bolt-like member 36 is mounted in the frame member 12a so as to be flush with the surface 28a thereof. Consequently, the bolt-like member 36 does not prevent the upper member 12b from resting on the lower frame member 12a in the lowered position. As illustrated in FIG. 4, the flexible member 16 typically folds and hangs on the inside of the cargo bed area when the extension apparatus 10 is in the lowered position. The flexible member 16 extends from the channel portions 30a,b through the gap between the surfaces 29a,b and into the cargo bed area.

As illustrated in FIGS. 1 and 3, when in the raised position, the flexible member 16 of the extension apparatus 10 is stretched tightly between the lower and upper frame members 12a,b so as to have relatively uniform vertical tension throughout. As illustrated in FIG. 6 the extension apparatus, due to the relatively uniform horizontal and vertical tightness of the flexible member 16, is sturdy and capable of supporting a roll-up tarp apparatus 80 which might be utilized to cover the cargo bed area.

While there are various roll-up tarp apparatus available on the market, the roll-up tarp apparatus illustrated in FIG. 6 includes a tarp 82 rolled onto a tube 88 along one edge thereof. The tarp 82 and the tube 88 are supported by spaced apart truss member 84' or beam members 84 which are in turn suitably secured to the upper frame member 12b. The beam members 84 span from the upper frame member 12b on one side of the cargo bed to the upper frame member 12b on the other side of the cargo bed thereby providing a frame work over which the tarp can be positioned. The tarp 82 is illustrated in FIG. 7 as being fastened to the upper frame member 12b along one side of the cargo bed by a clamp apparatus 86 which includes an arcuate portion for retaining a hem portion of the tarp which has an elongated member 89 inserted therein and a portion projecting above the surface of the tarp 82 so as to retain the roll of tarp on top of the cargo bed when the tarp is in the stored, rolled-up position. To use the tarp, the tarp 82 is rolled across the beam members 84 by attaching a crank handle to a universal joint at the back end of the tube 88 and consequently rotating the handle. The tarp 82 is then held in the end closed position by hold down straps suitably fastened to the side of the cargo bed by hold down clamp apparatus 90. It will be appreciated that the present invention might be utilized with other variations of roll-up tarp apparatus and that the particular configuration shown is merely exemplary of the present inventions utility with roll-up tarp apparatus.

In addition, the present invention will resist any wind resistance imparted thereon by the moving vehicle. Furthermore, the present invention is sufficiently sturdy to oppose any forces exerted thereon by typical cargo loads.

The extension apparatus 10 of the present invention is raised into the raised position by the horizontally spaced apart jack-like extender apparatus 18 illustrated in FIGS. 3 and 5. The jack apparatus 18 includes two elongated members 50 and 52 operatively connected to each other. In one embodiment, one inch square tubing is utilized to form members 50 and 52. The member 52 includes a first relatively straight portion 52a and a second relatively straight portion 52b which is oblique with respect to the first portion 52a. The member 50 is slidably attached to the member 52 by a generally U-shaped bracket 54. The bracket 54 includes a set screw 56 or the like for releasably attaching the bracket 54 to the straight portion 52a of the elongated member 52 such that the bracket 54 is mounted for adjustable movement along the straight portion 52a of the member 52.

The top end of the elongated member 52 includes an extension 66 adapted for releasable reception in an aperture 68b defined by the surface 29b adjacent the channel portion 30b. The elongated member 50 includes an extension 70 at the lower end thereof adapted for releasable reception in an aperture 68a defined by the surface 29a adjacent channel portion 30a.

The member 50 is pivotally attached opposite the upper end thereof to the bracket 54 by a pivot shaft 58 and bushing 60 combination thereby enabling member 50 to be pivoted away and toward leverage handle portion 52a. Furthermore, member 50 is interconnected at a location between its upper and lower ends to the member 52 along straight portion 52a by a pair of elongated members 62 which define apertures 64 therein. In the preferred embodiment shown, each of the interconnecting members 62 defines two spaced apart apertures 64 which are aligned with those on the other member 62.

Consequently, to raise the extension apparatus 10 of the present invention, it will be appreciated that the upper frame member 12b is manually raised by hand to a height above the lower frame member 12a such that the extensions 70 and 66 of the jack apparatus 18 can be inserted into the apertures 68a,b, respectfully, of the frame members 12a,b. The handle portion 52a of the jack apparatus 18 is then forced downwardly toward the elongated member 50 and the flexible member 16 so as to function as a leverage arm thereby causing the elongated members 50, 52 to pivot about the pivot shaft 58 which results in the ends of the jack apparatus, including extension 66 and 70, moving farther apart and raising extension apparatus 10. As the jack apparatus pivots, it moves in closer to the flexible member 16. As illustrated in FIG. 5, the jack apparatus 18 may be locked by a lock pin 72 in a partially extended position or locked in a fully extended position as illustrated in FIG. 3.

The adjustable bracket 54 enables variable adjustment in the amount of spacing between the lower and upper frame members 12a,b when in the raised position which correspondingly varies the tightness of the flexible members 16.

When in the stored lowered position, the upper frame member 12b is suitably attached to the lower frame member 12a so as to be retained on the truck walls. As illustrated in FIG. 4, the upper frame member 12b might be attached to the lower frame member 12a by spaced apart bolt-like members 74 or the like. It will be appreciated that other methods of attaching the upper frame member to the lower frame member might be utilized.

The present invention is assembled by welding or fastening by other suitable methods, the lower and upper frame members 12a,b, together at their corners to form the rectangular configuration required to fit on top of the cargo area sidewalls 20. The flexible member 16 is then inserted into the continuous channel portions 30a,b. This can be accomplished by varying methods. In one method, one of the corners is left unattached until the flexible member 16 is inserted into the channel portions 30a,b. In another method, an access groove or channel is formed transversly in the frame members 12a,b so as to provide access to the channnel portions 30a,b thereby enabling the flexible member 16 to be inserted into the channel portions 30a,b after the frame work has been assembled.

After the flexible member 16 is positioned in the channel 30a,b, it is pulled tight so as to have uniform force on the tension throughout. This is made possible by the slidable mounting of the flexible member 16 in the channels 30a,b of the frame members 12a,b. After being suitably tightened, the loose ends of the flexible member 16 are suitably fastened to one another. This might be accomplished by gluing the ends of the flexible member, by a welding process, etc.

After having assembled the extension apparatus 10, it is next fastened to the top of the sidewalls 20 of the cargo bed area by spaced apart bolt-like members 36 as illustrated in FIG. 3 or any other suitable methods in keeping with the principles of the present invention.

To raise the extension apparatus 10 into the raised position, one of the jack apparatus 18 might be positioned in the apertures 68a,b near one end of the frame members 12a,b. The jack apparatus 18 is then placed in a partially extended position as illustrated in FIG. 5 and the lock pin 72 attached to retain the jack apparatus 18 in the partially extended position. The other end of the frame members 12a,b is then similarly raised by the use of one of the jack apparatus 18. The frame members 12a,b can then be fully extended into the raised position by a similar process and the jack apparatus 18 locked into position by the lock pin 72. Thus, the present invention provides for the raising or extending of the extension apparatus 10 without necessitating the simultaneous extension or raising of the entire frame assembly. This provides for easier operation and more uniform verticle tension in the flexible member 16.

What is claimed is:

1. An adjustable extension apparatus for mounting on the sidewalls of a vehicle's cargo bed area such as a truck box or the like, the extension apparatus comprising:

(a) a frame assembly including an upper frame member and a lower frame member, said lower frame member being fixably attached to the top of the cargo bed sidewall, said frame assembly having lowered and raised positions, said upper frame member resting on said lower frame member in said lowered position, said upper and lower frame members having opposing surfaces each including a horizontal surface portion and a surface portion oblique with respect to the horizontal surface portion, said oblique surface portions defining a gap therebetween facing the cargo bed area when in said lowered position, said upper frame member being vertically spaced from said lower frame member in said raised position, said upper and lower frame members each further defining a channel extending longitudinally thereof;

(b) horizontally spaced apart jack apparatus interconnecting said upper and lower frame members, said jack apparatus cooperating with said upper and lower frame members to raise and retain said upper frame member in said raised position; and (c) a flexible material having upper and lower edges being slidably attached to said lower and upper frame members at said upper and lower edges, said flexible material having a first side facing toward the vehicle's cargo bed area and a second side facing away from the vehicle's cargo bed area, said flexible material including a hem structure positioned adjacent to each of said upper and lower edges, said hem structure of said upper and lower edges being slidably mounted in said channels of said lower and upper frame members, said jack apparatus being positioned on the first side of said flexible material facing the vehicle's cargo bed area, said flexible material cooperating with said oblique surface portions of said lower and upper frame members to hang on the inside of the cargo bed area when in said lowered position.

2. An apparatus in accordance with claim 1, wherein said jack apparatus are adjustable to enable variable spacing of said upper frame member from said lower frame member in said raised position.

3. An apparatus in accordance with claim 1, wherein said jack apparatus are removed from said frame assembly when said upper frame member is resting on said lower frame member in said lowered position.

4. An apparatus in accordance with claim 1, wherein said upper frame member is fixedly attached to said lower frame member in said lowered position.

5. An apparatus in accordance with claim 1, wherein said upper and lower frame members are constructed of aluminium material.

6. An extension apparatus for mounting on the sidewalls of a vehicle's cargo bed area such as a truck box or the like, the extension apparatus comprising:

(a) a frame assembly including upper and lower frame members, said upper and lower frame members each defining a channel extending along the longitudinal extent of each of said upper and lower frame members, the channels being substantially parallel to one another and in substantially vertical alignment;

(b) a flexible material having upper and lower edges and interconnecting said upper and lower frame members, said flexible material including a hem proximate said upper and lower edges thereof, said hem of said upper and lower edges adapted for slidably engaging the channels of said upper and lower frame members respectively, said flexible material having a side facing the cargo bed area and a side facing away from the cargo bed area; and (c) jack means for raising said upper frame member and stretching said flexible material into a taut condition, said jack means being positioned on the side of said flexible material facing the cargo bed area, said jack means including a first elongated member, having upper and lower ends, said first elongated member being pivotally interconnected intermediate said upper and lower ends thereof to a second elongated member, for pivotal movement about a substantially horizontal axis extending substantially parallel to said flexible material, said second elongated member having upper and lower ends and being pivotally interconnected to said first elongated member proximate said upper end of said second elongated member, said first elongated member being pivotally interconnected to said upper frame member proximate said upper end, said second elongated member being removably interconnected to said lower frame member proximate said lower end, said first and second elongated members cooperating such that by forcing said lower end of said first elongated member downwardly and toward said flexible material said upper frame member is caused to raise and said flexible material is stretched into a taut condition.

7. An apparatus in accordance with claim 6, wherein said upper frame member is constructed and arranged for resting on top of said lower frame member in a lowered position.

8. An apparatus in accordance with claim 6, wherein said lower and upper frame members include opposing surfaces each including a horizontal surface portion and a surface portion oblique with respect to the horizontal surface portion whereby a gap facing the cargo bed area is defined between said oblique surface portions when said upper frame member is lowered onto said lower frame member, said flexible material cooperating with said oblique surface portions of said lower and upper frame members to fold up and hang on the inside of the cargo bed area.

9. An apparatus in accordance with claim 6, wherein said lower frame member is fixably attached to the top of the cargo bed sidewall.

10. An apparatus in accordance with claim 6, wherein said upper frame member is releasably attached to said lower frame member when in contact with said lower frame member.

11. An apparatus in accordance with claim 6, wherein a roll-up tarp assembly is attached to said upper frame member.

12. An apparatus in accordance with claim 6, wherein said first elongated member is pivotally interconnected to said second elongated member by a bracket, said first elongated member being slidably positioned in said bracket, said bracket including means for selectively securing said first elongated member against slidable movement.

* * * * *